United States Patent
Kondoh

(10) Patent No.: US 6,369,872 B1
(45) Date of Patent: Apr. 9, 2002

(54) ANTIFERROELECTRIC LIQUID CRYSTAL DISPLAY WITH LIQUID CRYSTAL LAYER STRUCTURE CONTROL

(75) Inventor: Shinya Kondoh, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/308,713

(22) PCT Filed: Sep. 14, 1998

(86) PCT No.: PCT/JP98/04138

§ 371 Date: May 24, 1999

§ 102(e) Date: May 24, 1999

(87) PCT Pub. No.: WO99/17152

PCT Pub. Date: Apr. 8, 1999

(30) Foreign Application Priority Data

Oct. 1, 1997 (JP) ............................................. 9-268306

(51) Int. Cl.⁷ ......................... G02F 1/133; G02F 1/141; C09K 19/02
(52) U.S. Cl. ........................................ 349/174; 349/72
(58) Field of Search ............................... 349/172, 174, 349/37, 160, 72

(56) References Cited

U.S. PATENT DOCUMENTS

| | | | | |
|---|---|---|---|---|
| 5,119,219 A | * | 6/1992 | Terada et al. .................. | 349/37 |
| 5,316,694 A | * | 5/1994 | Murashiro et al. ........ | 252/299.1 |
| 5,393,460 A | * | 2/1995 | Okabe et al. .......... | 252/299.65 |
| 5,781,266 A | * | 7/1998 | Nakao et al. ................ | 349/172 |
| 5,798,814 A | * | 8/1998 | Konuma ..................... | 349/172 |
| 5,929,833 A | * | 7/1999 | Kobshobu et al. .......... | 345/101 |

* cited by examiner

Primary Examiner—Kenneth Parker
(74) Attorney, Agent, or Firm—Finnegan, Henderson, Farabow, Garrett & Dunner, L.L.P.

(57) ABSTRACT

An antiferroelectric liquid crystal display having: a temperature sensor for measuring the temperature of a liquid crystal panel (10); a heater (102) for heating the liquid crystal panel (10); and a heater control circuit (17) for controlling the temperature of the liquid crystal panel (10), wherein the liquid crystal panel (10), while being driven to produce a display, is maintained at a temperature at which smectic layer spacing in an antiferroelectric liquid crystal material sandwiched within the liquid crystal panel (10) becomes the smallest. In this antiferroelectric liquid crystal display, when the temperature of the liquid crystal panel (10), after power on, has reached the temperature at which the smectic layer spacing in the antiferroelectric liquid crystal material becomes the smallest, a layer structure control voltage waveform is applied to the liquid crystal panel (10).

27 Claims, 8 Drawing Sheets

BLACK DISPLAY STATE

WHITE DISPLAY STATE

ANTIFERROELECTRIC LIQUID CRYSTAL DISPLAY WITH LIQUID CRYSTAL LAYER STRUCTURE CONTROL

TECHNICAL FIELD

The present invention relates to an antiferroelectric liquid crystal display, such as a liquid crystal display panel or a liquid crystal optical shutter array, that has a liquid crystal layer consisting of antiferroelectric liquid crystal.

BACKGROUND ART

Liquid crystal panels using antiferroelectric liquid crystals have been researched vigorously since it was reported in Unexamined Japanese Patent Publication No. 2-173724 by Nippondenso and Showa Shell Sekiyu that such liquid crystal panels provide wide viewing angles, are capable of fast response, and have good multiplexing characteristics.

The prior art driving method, however, has had the problem that when the same image pattern has been displayed for a long period of time, a phenomenon occurs in which, when a different image pattern is displayed on the screen, the previously displayed image remains slightly visible on the screen (this phenomenon is hereinafter called the "image-sticking phenomenon").

This phenomenon is believed to be caused by the property that antiferroelectric liquid crystals form a layer structure within a cell, with the way the layers bend being different depending on the display state (i.e. whether it is a white display state or a black display state). To alleviate this phenomenon, Unexamined Japanese Patent Publication No. 6-202078 proposes a liquid crystal display which includes, in addition to the display driving circuit, a layer structure control voltage waveform circuit capable of applying a layer structure control voltage waveform to the panel.

This prior art device, however, requires that the layer structure control voltage waveform be applied in every predetermined period (for example, every frame period or every scanning period). Since images different from the display image are displayed frequently, degradation of display quality has been a problem.

It is, accordingly, an object of the present invention to provide an antiferroelectric liquid crystal display that alleviates the image-sticking phenomenon without degrading the display quality.

DISCLOSURE OF THE INVENTION

To achieve the above object, the present invention provides the following configuration.

The antiferroelectric liquid crystal display of the invention includes a temperature sensor for measuring the temperature of a liquid crystal panel, a heater for heating the liquid crystal panel, and a heater control circuit for controlling the temperature of the liquid crystal panel, wherein the liquid crystal panel, while being driven to display, is constantly maintained at a temperature at which the smectic layer spacing in an antiferroelectric liquid crystal material, sandwiched within the liquid crystal panel, becomes the smallest.

In the above antiferroelectric liquid crystal, when the temperature of the liquid crystal panel, after power on, has reached the temperature at which the smectic layer spacing in the antiferroelectric liquid crystal material becomes the smallest, a layer structure control voltage waveform is applied to the liquid crystal panel. The layer structure control voltage waveform is also applied to the liquid crystal panel when the temperature of the liquid crystal panel has changed during a display and has thereafter been brought back to the temperature at which the smectic layer spacing in the antiferroelectric liquid crystal material becomes the smallest.

The antiferroelectric liquid crystal display further includes a layer structure control voltage waveform circuit for generating the layer structure control voltage waveform and a voltage waveform control circuit for controlling timing and the temperature of the liquid crystal panel when the layer structure control voltage waveform is to be applied to the liquid crystal panel.

The antiferroelectric liquid crystal display further includes means for blocking light from a backlight in the antiferroelectric liquid crystal display when the layer structure control voltage waveform is applied to the liquid crystal panel.

The antiferroelectric liquid crystal display further includes means for monitoring the polarization reversal current of the liquid crystal display, and for detecting the temperature of the liquid crystal panel from the value of this current, instead of detecting the temperature using the temperature sensor.

With the above configuration, the image sticking phenomenon can be alleviated without degrading the display quality.

DETAILED DESCRIPTION OF THE INVENTION

Figure 1:
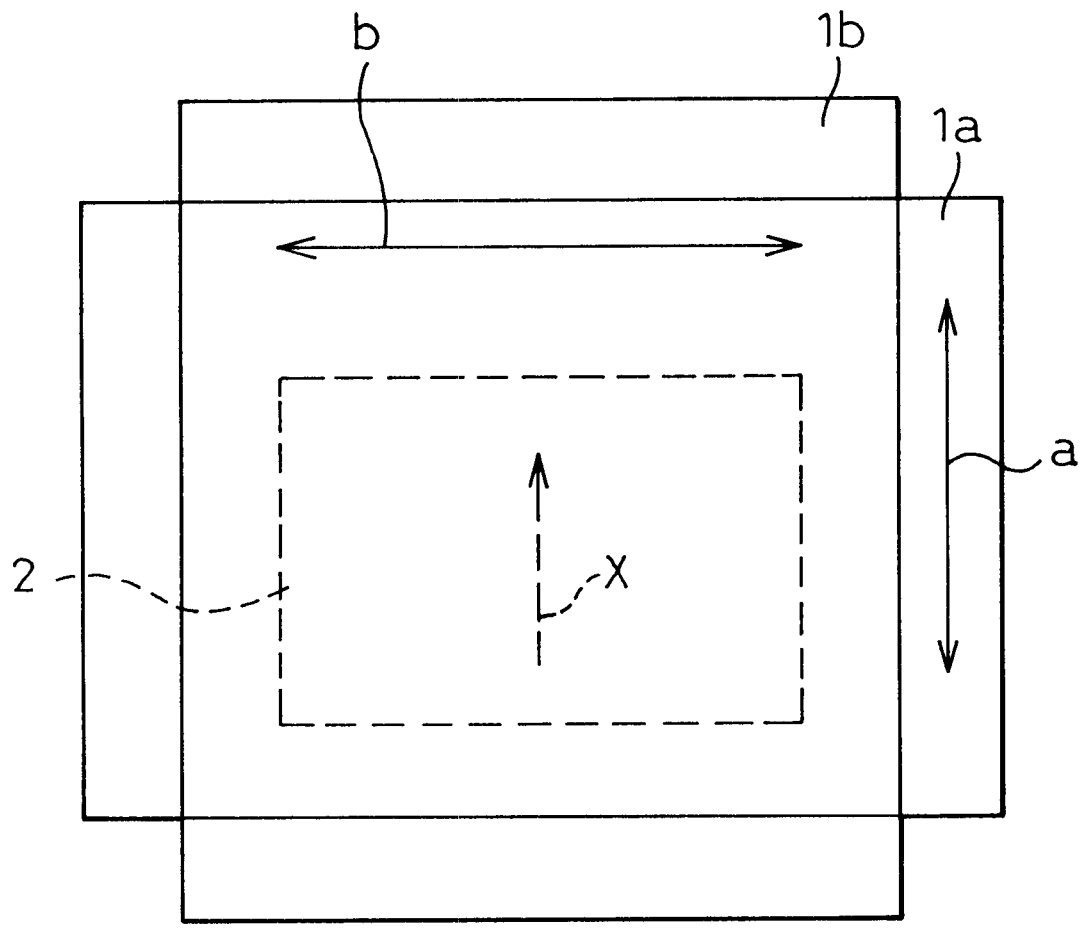
FIG. 1 is a diagram showing the arrangement of a liquid crystal device using an antiferroelectric liquid crystal as a display element.

FIG. 1 is a diagram showing the arrangement of a liquid crystal device using an antiferroelectric liquid crystal as a display element. Between polarizers 1a and 1b, arranged in a crossed Nicol configuration, is placed a liquid crystal cell 2 in such a manner that the average long axis direction X of molecules in the absence of an applied voltage is oriented substantially parallel to either the polarization axis, a, of the polarizing plate 1a or the polarization axis, b, of the polarizing plate 1b. Then, the liquid crystal cell is set up so that when no voltage is applied, light from the backlight is blocked and black is displayed, and when a voltage is applied, light from the backlight is transmitted therethrough and white is diplayed.

Figure 2:
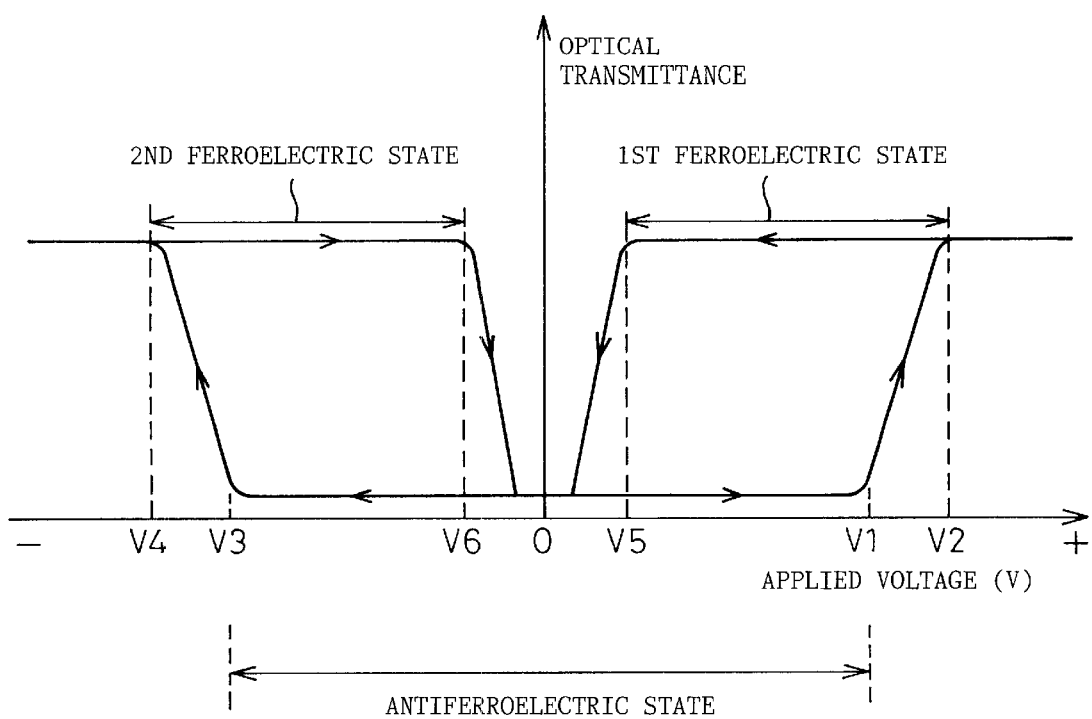
FIG. 2 is a diagram showing how the light transmittance of the antiferroelectric liquid crystal display element varies with an applied voltage.

When voltage is applied across the thus arranged liquid crystal cell, the optical transmittance varies with the applied voltage, describing a loop as plotted in the graph of FIG. 2. The voltage value at which the optical transmittance begins to change when the applied voltage is increased is denoted by V1, and the voltage value at which the optical transmittance reaches saturation is denoted by V2, while the voltage value at which the optical transmittance begins to drop when the applied voltage is decreased is denoted by V5. Further, the voltage value at which the optical transmittance begins to change when a voltage of opposite polarity is applied and the absolute value of the applied voltage is increased, is denoted by V3, and the voltage value at which the optical transmittance reaches saturation is denoted by V4, while the voltage value at which the optical transmittance begins to change when the absolute value of the applied voltage is decreased is denoted by V6. As shown in FIG. 2, a first ferroelectric state is selected when the value of the applied voltage is greater than the threshold of the antiferroelectric liquid crystal molecules. When the voltage of the opposite polarity greater than the threshold of the antiferroelectric liquid crystal molecules is applied, a second ferroelectric state is selected. In either of these ferroelectric states, when the voltage value drops below a certain threshold, an antiferroelectric state is selected. The antiferroelectric liquid crystal display can be constructed to produce a black display in the antiferroelectric state or a white display in the antiferroelectric state. The present invention is applicable to both modes of operation. The description hereinafter given assumes that the display is set up to produce a black display in the antiferroelectric state.

Figure 3:
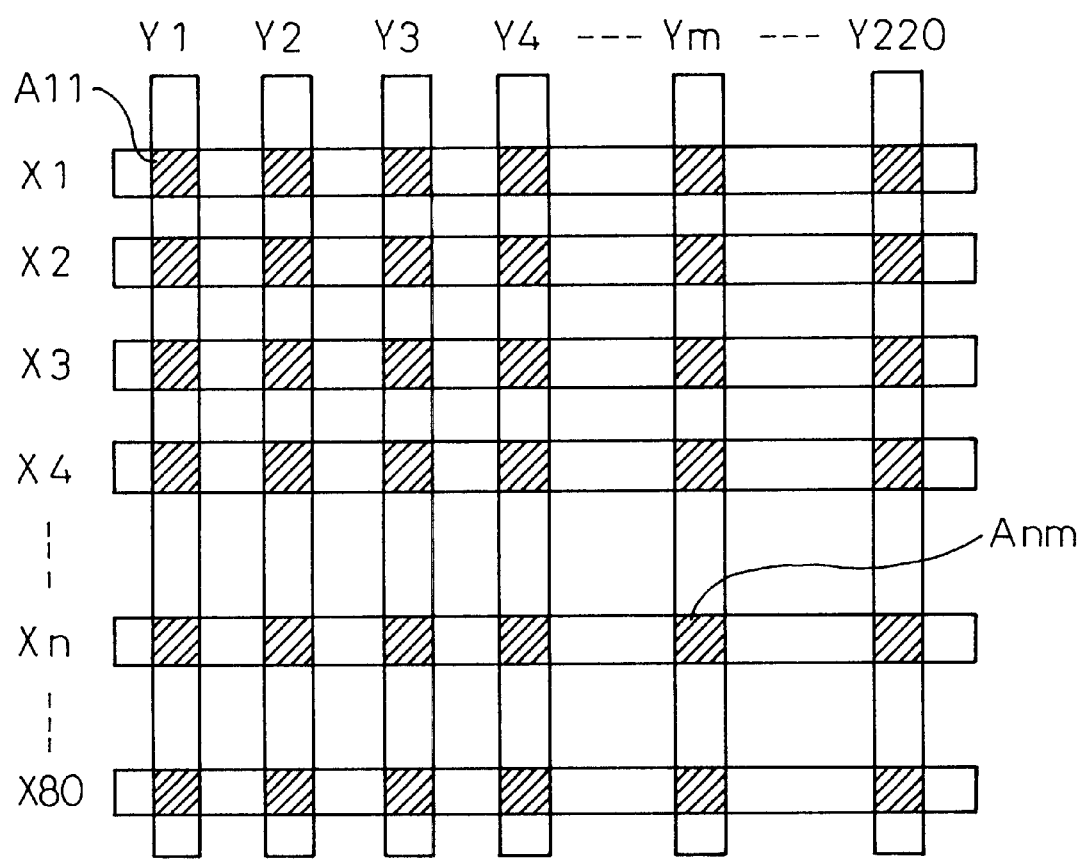
FIG. 3 is a diagram showing scanning electrodes and signal electrodes formed in a matrix array.

Next, a conventional liquid crystal driving method for an antiferroelectric liquid crystal will be described. FIG. 3 is a diagram showing an example of an electrode arrangement in a liquid crystal panel in which scanning electrodes and signal electrodes are arranged in a matrix form on substrates. This electrode arrangement comprises of the scanning electrodes (X1, X2, by Nippondenso and Showa Shell Sekiyu that such X3, . . . , Xn, . . . X80) and signal electrodes (Y1, Y2, Y3, Ym, . . . , Y220), and shaded portions where the scanning electrodes and signal electrodes intersect are pixels (A11, Anm). Voltage is applied to the scanning electrodes in sequence one scanning line at a time and, in synchronism with the voltages, voltage waveforms corresponding to the display states of the associated pixels are applied from the signal electrodes. The display state of each pixel is written in accordance with a composite waveform produced by the voltage waveforms of the signal electrode and the scanning electrode.

Figure 4:
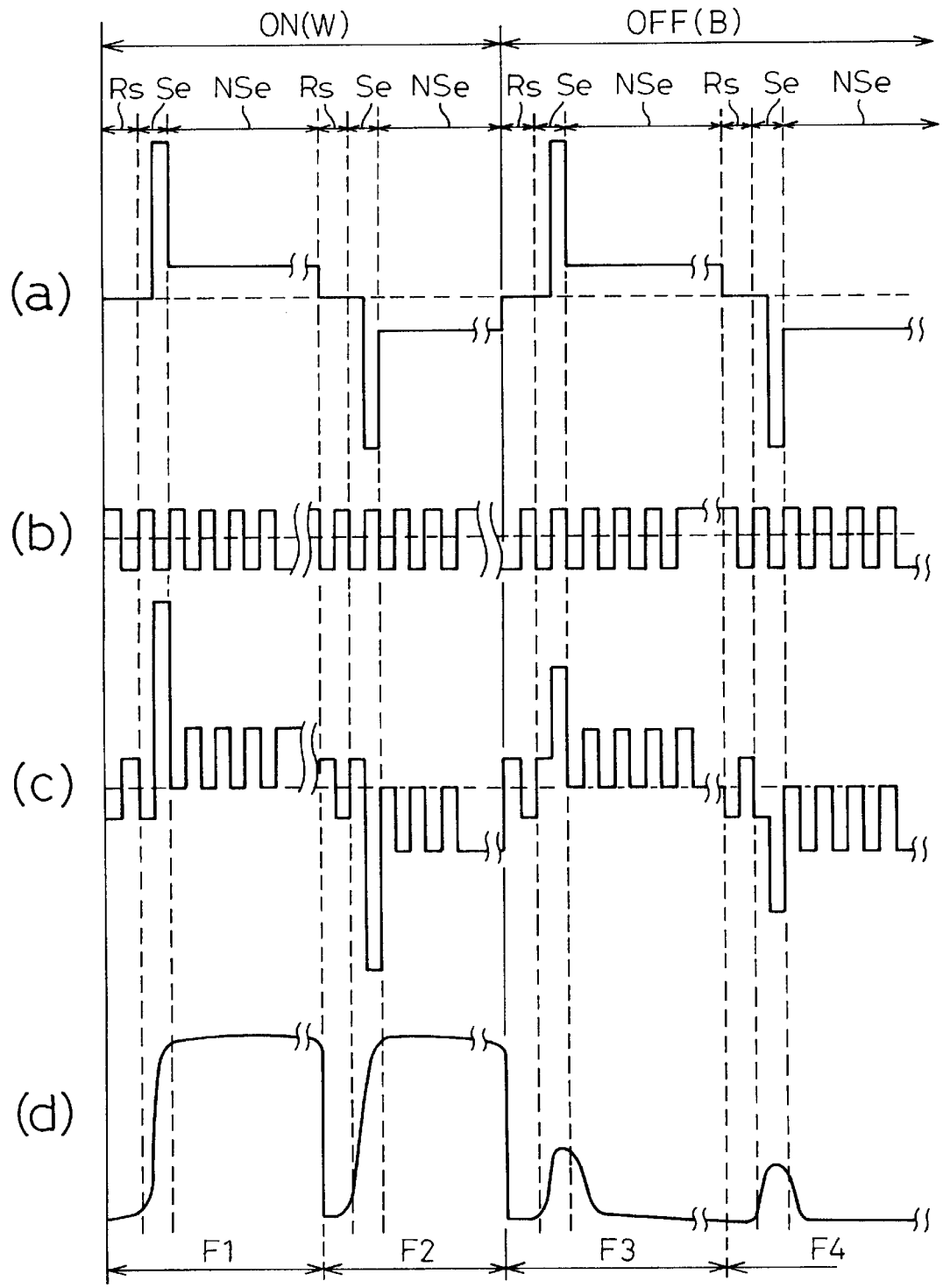
FIG. 4 is a diagram showing voltage waveforms applied to a scanning electrode, signal electrode, and pixel, and their corresponding light transmittance, according to a conventional art driving method.

FIG. 4 shows drive voltage waveforms for an antiferroelectric liquid crystal according to the conventional art. As shown in FIG. 4, writing to the pixel is accomplished by applying a scanning voltage (a) to the scanning electrode (Xn) and a signal voltage (b) to the signal electrode (Ym) and thereby applying the resulting composite voltage (c) to the pixel (Anm). In FIG. 4, the first or second ferroelectric state or the antiferroelectric state is selected in a selection period (Se), and the selected state is held throughout the following non-selection period (NSe). That is, a selection pulse is applied in the selection period (Se), and the transmittance (d) obtained as the result of the selection is maintained throughout the following non-selection period (NSe) to display.

In an antiferroelectric liquid crystal display device, it is generally practiced to reset the pixel state to the first or second ferroelectric state or the antiferroelectric state immediately before writing to the pixel. In FIG. 4, for example, each selection period (Se) is preceded by a reset period (Re). During this reset period, a voltage lower than the threshold voltage is applied to the pixel to reset the antiferroelectric liquid crystal to the antiferroelectric state. By resetting the state of each pixel immediately before writing necessary information to the pixel, as just described, a good display can be produced with each pixel being unaffected by its previously written state. In FIG. 4, F1, F2, F3, and F4 denote the first, second, third, and fourth frames, respectively. A white display is produced in the first and second frames, while a black display is produced in the third and fourth frames. As shown in the figure, the voltage polarity is usually reversed from one frame to the next.

Figure 5:
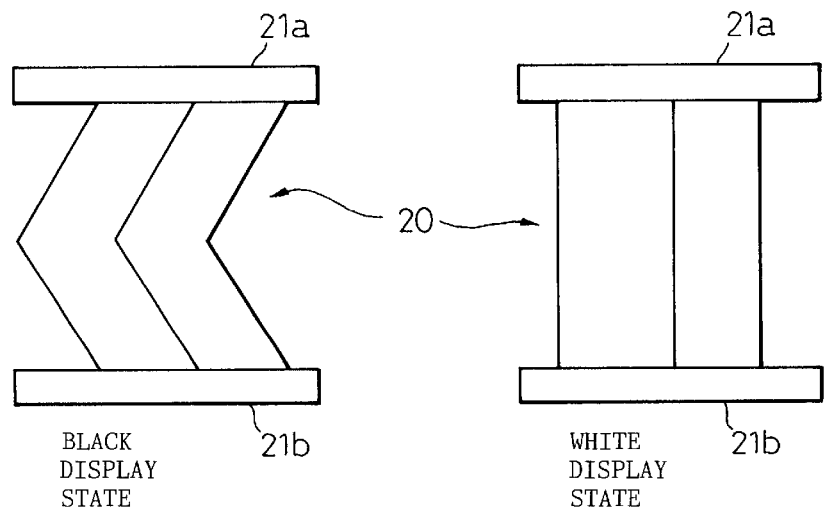
FIG. 5 is a diagram showing a layer structure in an antiferroelectric liquid crystal display.

As earlier noted, antiferroelectric liquid crystals form a layer structure within a cell. FIG. 5 shows the layer structure within the cell of antiferroelectric liquid crystal. A liquid crystal layer 20 is sandwiched between glass substrates 21a and 21b. As shown, in the case of a black display, the layer structure is slightly bent at the center, while in the case of a white display, the layer structure is straightened. The previously described "image sticking phenomenon" is believed to be caused by this layer structure changing according to the display state.

The inventors conducted a detailed study on the image sticking phenomenon of the antiferroelectric liquid crystal display. The results of the study will be described below.

First, a white pattern and a black pattern are displayed simultaneously on the same panel, and next the entire panel is driven in black display mode. Then, the brightness of pixels previously displayed in white is compared with the brightness of pixels previously displayed in black. The result shows that the brightness of the pixels previously displayed in white is lower than the brightness of the pixels previously displayed in black.

Figure 6:
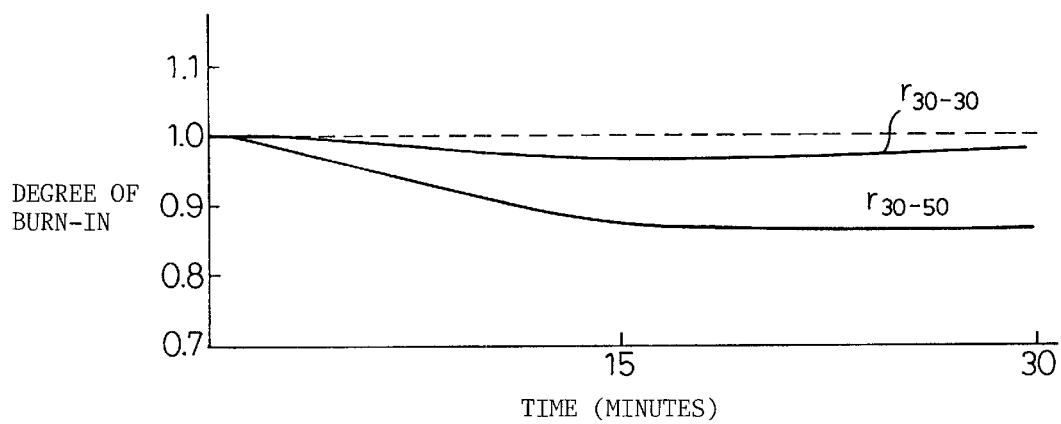
FIG. 6 is a diagram showing the degree of image sticking of the antiferroelectric liquid crystal display.

FIG. 6 is a graph showing the degree of image sticking of the antiferroelectric liquid crystal display. After applying a layer structure control voltage waveform to the antiferroelectric liquid crystal display, a white pattern and a black pattern are displayed simultaneously on the same panel, and thereafter all the pixels are driven in the black display mode. The ratio between the brightness of the pixels previously displayed in white and that of the pixels previously displayed in black are measured after 15 minutes and 30 minutes of driving respectively and are plotted (the degree of image sticking). The layer structure control voltage waveform used here is a rectangular waveform having positive and negative polarities. Here, $r_{30\text{-}50}$ is a graph obtained in the following manner. First, the layer structure control voltage waveform is applied to the antiferroelectric liquid crystal panel held at a temperature of 30° C., and then the white pattern and black pattern are displayed on the same panel maintained at 30° C., after which all the pixels are driven in the black display mode. Then, the ratio between the brightness of the pixels previously displayed in white and that of the pixels previously displayed in black are measured and are plotted (the degree of image sticking). For the graph of $r_{30-50}$, first the layer structure control voltage waveform is applied to the antiferroelectric liquid crystal panel held at a temperature of 30° C., and then the white pattern and black pattern are displayed on the same panel with the panel temperature this time held at 50° C., after which all the pixels are driven in the black display mode. Then, the ratios between the brightness of the pixels displayed in white and that of the pixels displayed in black are measured and are plotted (the degree of image sticking). From these graphs, it can be seen that, in the case where the temperature when the display was produced is the same as the temperature when the layer structure control voltage waveform was applied, the brightness ratio remains substantially unchanged and the image sticking phenomenon does not occur, as contrasted with the case where the temperature when the display was produced is different from the temperature when the layer structure control voltage waveform was applied. The term "brightness" is used here synonymously with transmittance.

Figure 7:
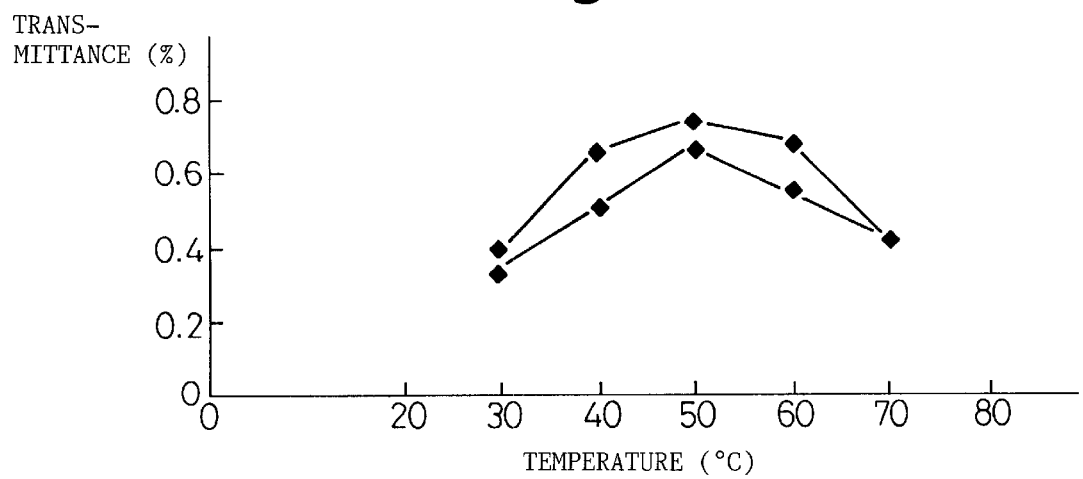
FIG. 7 is a diagram showing the brightness versus temperature relationship of the antiferroelectric liquid crystal display.

To investigate the cause, the inventors measured pixel brightness at various temperatures by applying the layer structure control voltage waveform at 30° C. and then changing the temperature from 30° C. to 40° C. to 50° C. to 60° C. to 70° C. to 60° C. to 50° C. to 40° C. and then back to 30° C. It was found that the brightness increased when the temperature was raised from 30° C. up to 50° C., as shown in FIG. 7. When this condition was examined under a polarization microscope, a degradation in alignment characteristic was observed due to increased alignment defects, etc. at 50° C. compared with those at 30° C.

Figure 8:
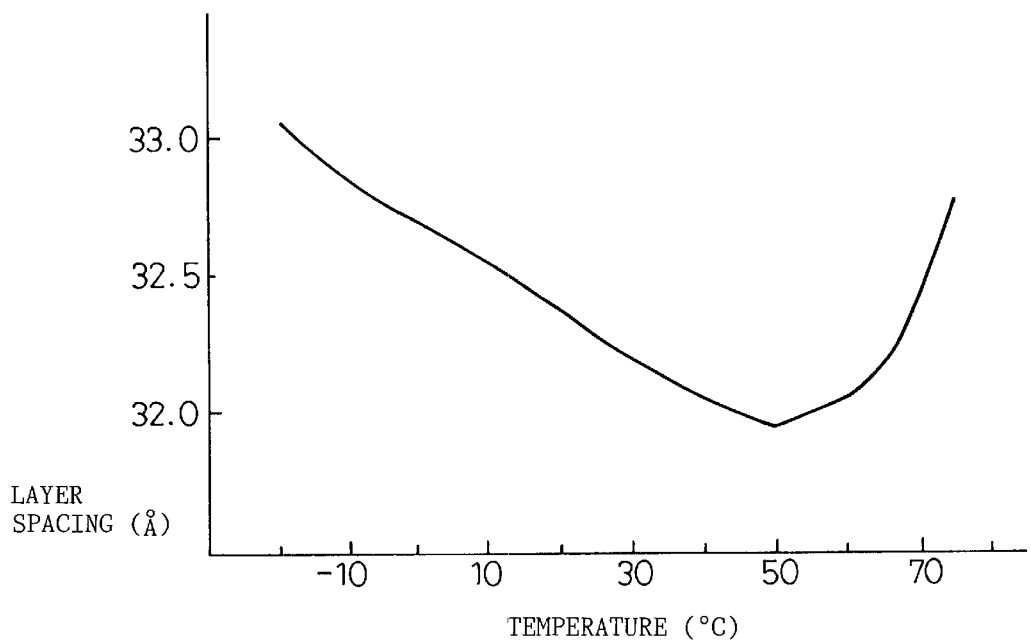
FIG. 8 is a diagram showing the layer spacing versus temperature relationship of the antiferroelectric liquid crystal display used in the present invention.

Further, the layer spacing in the smectic phase of the liquid crystal material was measured in relation to the temperature. The result is shown in FIG. 8.

From the above experiment, the inventors presumed that a change in temperature caused a change in the layer spacing in the antiferroelectric liquid crystal, increasing or decreasing the alignment defects, etc. and thus changing the brightness. For example, when the temperature changes from 30° C. to 50° C., the layer spacing reduces, increasing the alignment defects and thus increasing the brightness. It was also found that when a voltage of a certain value (the voltage value for a white display state) was applied to a pixel in an alignment condition in which the brightness changed, realignment of the layer structure occurred, as a result of which the alignment defects, etc. vanished and the brightness lowered. It was likewise found that when a voltage lower than a certain voltage value (the voltage value for a black display state) was applied, the realignment of the layer structure did not occur, so that the alignment defects, etc. did not vanish and hence there was no change in the brightness. Accordingly, in the case of a pixel driven in the white display mode, the alignment defects vanish and the brightness falls, while in the case of a pixel driven in the black display mode, no change occurs in the brightness since the alignment defects do not vanish. A brightness difference thus occurs between the pixel displayed in white and the pixel displayed in black, and it has been found that this difference is the cause for the image sticking.

When the relationship between the layer spacing and the alignment degradation was examined in detail, it was also found that the alignment degradation occurred when the layer spacing was reduced, but did not occur when it was increased.

It is thus shown that producing a display at a temperature where the layer spacing becomes the smallest is the most effective in suppressing the image sticking phenomenon since at that temperature the change of the layer spacing can be held to a minimum in the presence of minor variations in temperature. If there occurs a change in the temperature of the liquid crystal panel being driven to produce a display, and the change is in the direction that reduces the layer spacing, the alignment defects increase and the brightness rises. In such cases, by applying the layer structure control voltage waveform, and thereby realigning the layers and eliminating the alignment defects, etc., the brightness can be lowered and pixel degradation suppressed, alleviating the image sticking phenomenon.

Since the entire screen is driven in a white state while the layer structure control voltage waveform is being applied to the liquid crystal panel, the viewer watching the screen may perceive the glare as discomfort. It is therefore preferable to turn off the backlight and blank the display during that period.

From the results of the above study, the inventors found that provision of the following means is effective in alleviating the image sticking phenomenon of the antiferroelectric liquid crystal display.

First, the liquid crystal panel being driven to produce a display is maintained at a temperature at which the layer spacing of the smectic layer, in the antiferroelectric liquid crystal material sandwiched within the liquid crystal panel, becomes the smallest.

Second, when the temperature of the liquid crystal panel, after power on, has reached the temperature at which the layer spacing of the smectic layer in the antiferroelectric liquid crystal material becomes the smallest, a layer structure control voltage waveform is applied to the liquid crystal panel. The layer structure control voltage waveform is also applied to the liquid crystal panel when the temperature of the liquid crystal panel has changed during production of a display and has thereafter been brought back to the temperature at which the layer spacing becomes the smallest.

Third, a voltage waveform control circuit is provided that controls the timing and temperature when the layer structure control voltage waveform is to be applied to the liquid crystal panel.

Fourth, light from the backlight in the liquid crystal display is blocked when the layer structure control voltage waveform is applied to the liquid crystal panel.

Fifth, the polarization reversal current of the liquid crystal display is monitored, and the temperature is detected from the value of this current, instead of detecting the temperature using a temperature sensor.

An embodiment of the present invention for implementing the above means will be described in detail below with reference to drawings.

Figure 9:
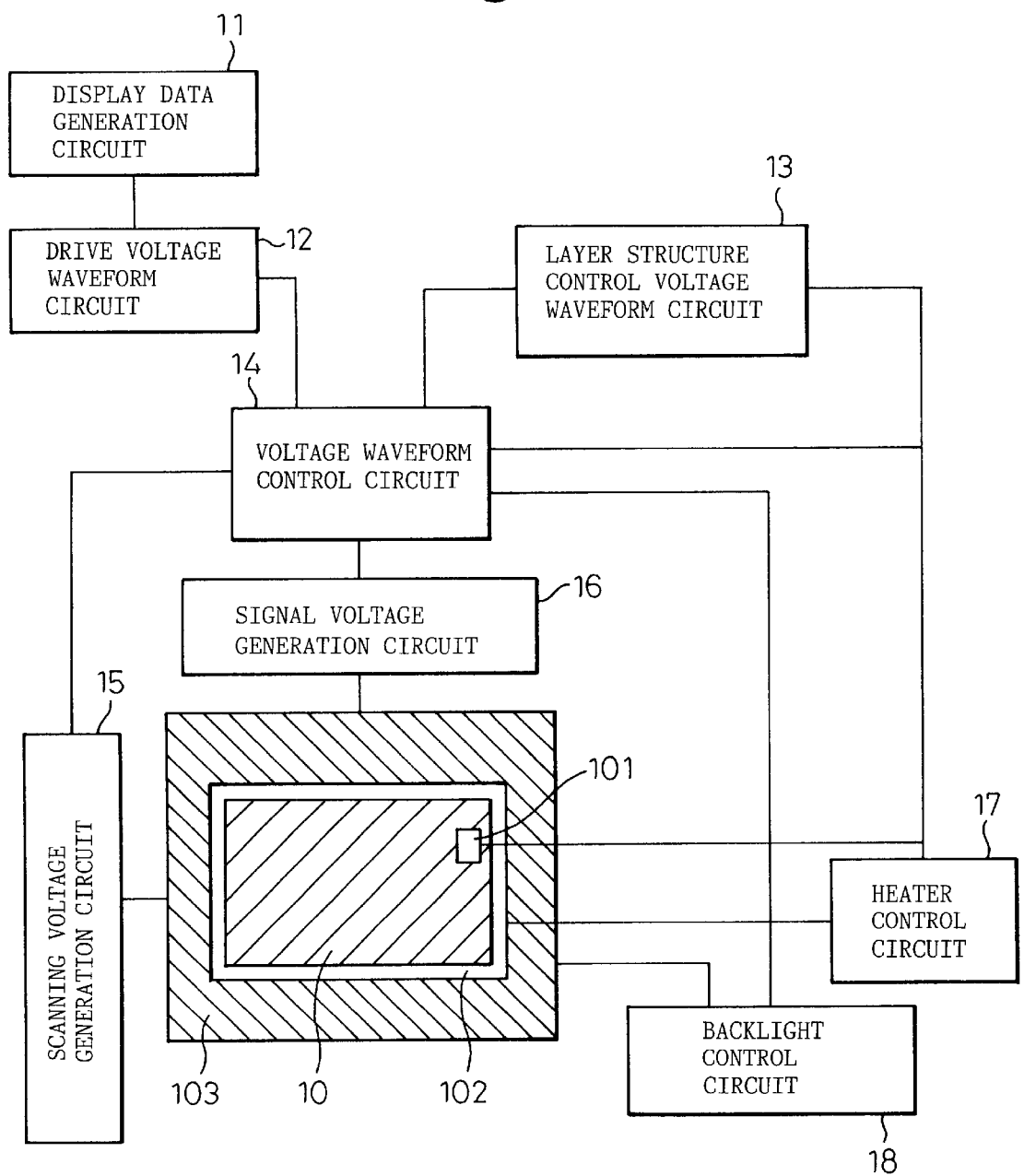
FIG. 9 is a block diagram of the antiferroelectric liquid crystal display used in the present invention.

FIG. 9 is a block diagram of the antiferroelectric liquid crystal display used in the present invention.

The antiferroelectric liquid crystal display according to the present invention is provided with two kinds of circuits, a drive voltage waveform circuit 12 for applying drive voltage waveforms and a layer structure control voltage waveform circuit 13 for controlling the layer structure, one or the other of which being selected according to the requirement. A voltage waveform control circuit 14 performs control to select the output voltage waveform from one or the other of the two circuits. Based on a signal supplied from a display data generation circuit 11, the drive voltage waveform circuit 12 supplies signals to a scanning voltage generation circuit 15 and a signal voltage generation circuit 16 via the voltage waveform control circuit 14. A temperature sensor 101 for measuring the temperature of a liquid crystal panel 10 is attached to the surface of the liquid crystal panel 10. Temperature information from the temperature sensor 101 is sent to the voltage waveform control circuit 14 to automatically select one or the other of the two waveform circuits according to the temperature. The temperature information from the temperature sensor is also passed to a heater control circuit 17 which controls the temperature of a heater 102 to constantly maintain the liquid crystal panel 10 at a predetermined temperature.

Further, in the present invention, a backlight control circuit 18 for controlling the power supply of a backlight 103 is provided to control the turning on and off of the backlight in accordance with a signal from the voltage waveform control circuit 14. When the layer structure control voltage waveform is selected, the backlight is turned off and, when the drive voltage waveform is selected, the backlight is turned on. This serves to reduce the discomfort that the viewer watching the screen of the liquid crystal panel may perceive from the display produced during the application of the layer structure control voltage waveform.

AS previously described, FIG. 8 is a diagram showing the layer spacing versus temperature relationship of the liquid crystal material used in the present invention. As can be seen from FIG. 8, the temperature at which the layer spacing in the liquid crystal material used in the present invention becomes the smallest is around 50° C. In view of this, the voltage waveform control circuit 14 performs control in such a manner that when the temperature of the liquid crystal panel surface has reached 50° C. after power was turned on to the antiferroelectric liquid crystal display, the layer structure control voltage waveform is applied at least once, for example, for 60 seconds. Further, if the temperature of the liquid crystal panel surface drops below 30° C. because of failure of proper heater temperature control due to a heater breakdown or an abrupt change in ambient temperature, the layer structure control voltage waveform is again applied, for example, for 10 seconds when the temperature of the liquid crystal panel is brought back to 50° C.

Of the drive voltage waveforms output from the drive voltage waveform circuit 12, at least the scanning voltage waveform consists of two frames to produce one complete screen, the voltage waveform for one frame being symmetric in polarity to the voltage waveform for the other frame with respect to 0 V, as shown, for example, in FIG. 4. Each frame consists of a selection period (Se) for determining pixel display state, a non-selection period (NSe) for maintaining the state determined in the selection period (Se), and a reset period (Rs) for forcefully resetting the state to a prescribed state regardless of the display state. In the present invention, the pulse to be applied in the selection period is set to 25 V, and the pulse to be applied in the non-selection period is set to 8 V. In the reset period, no voltage is applied so that the display state is forced into the black display state (antiferroelectric state), the duration of the reset period being chosen to be 4 ms. A 30-Hz rectangular wave of ±40 V is used for the layer structure control voltage waveform.

Figure 10:
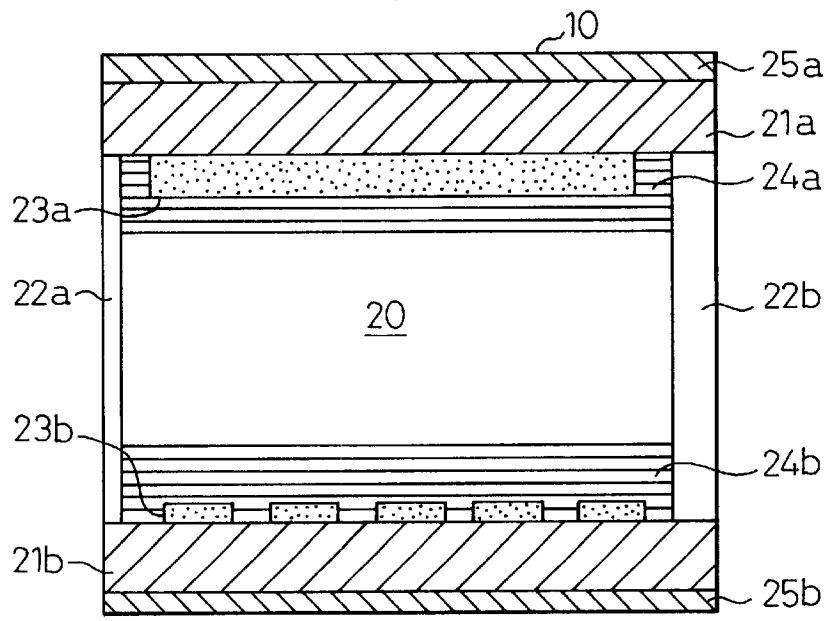
FIG. 10 is a diagram showing the panel structure of the antiferroelectric liquid crystal display according to the present invention.

FIG. 10 is a diagram showing the structure of the liquid crystal panel 10 constituting the antiferroelectric liquid crystal display used in the present invention. The liquid crystal panel 10 used in this embodiment comprises: a pair of glass substrates 21a and 21b sandwiching therebetween an antiferroelectric liquid crystal layer 20 with a thickness of about 1.7 µm; and sealing members 22a and 22b for bonding the two glass substrates together. On the opposing surfaces of the glass substrates are formed electrodes 23a and 23b, which are coated with polymeric alignment films 24a and 24b, respectively, and are treated by rubbing. On the outside surface of one glass substrate is disposed a first polarizing plate 25a with its polarization axis oriented parallel to the rubbing axis, while on the outside surface of the other glass substrate, a second polarizing plate 25b is arranged with its polarization axis oriented at 90° to the polarization axis of the first polarizing plate 25a. Further, as shown in FIG. 9, the heater 102 is mounted around the periphery of the liquid crystal panel 10 to constantly maintain the liquid crystal panel at a predetermined temperature. The temperature sensor 101 is attached to the glass substrate surface.

Figure 11:
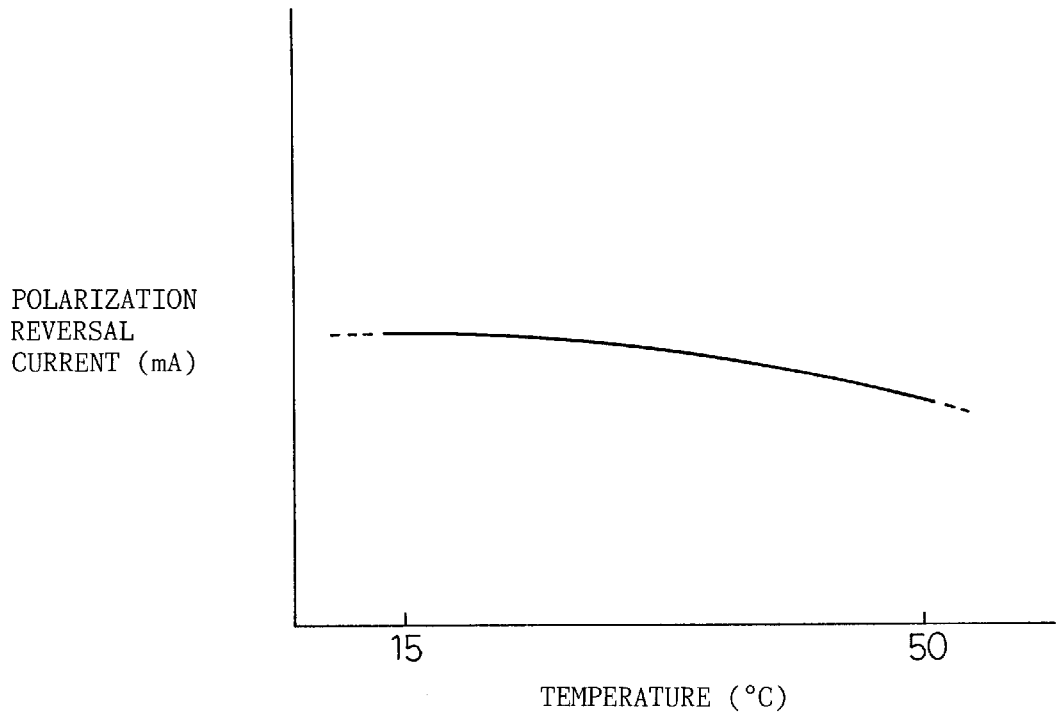
FIG. 11 is a diagram showing the magnitude of spontaneous polarization versus temperature relationship of the antiferroelectric liquid crystal material according to the present invention.

In the above embodiment, the spontaneous polarization reversal current of the liquid crystal can be used in place of the temperature sensor 101. A current called the spontaneous polarization reversal current flows when antiferroelectric liquid crystal molecules switch from one state to another. The magnitude of the current value is dependent on the value of the spontaneous polarization (Ps) of the liquid crystal molecules, which in turn is dependent on temperature. Therefore, by detecting the value of the spontaneous polarization reversal current, the temperature of the liquid crystal panel can be determined with higher accuracy. FIG. 11 is a diagram showing the spontaneous polarization reversal current versus temperature relationship of-the liquid crystal used in the present invention. A reversal current measuring pixel can be used as an electrode for measuring the polarization reversal current value.

What is claimed is:

1. An antiferroelectric liquid crystal display having a liquid crystal panel including an antiferroelectric liquid crystal material sandwiched therein and in which a smectic layer is formed, wherein the display is constructed so that the liquid crystal panel, while being driven to produce a display, is maintained at a temperature at which the smectic layer spacing in the antiferroelectric liquid crystal material sandwiched within said liquid crystal panel becomes the smallest.

2. An antiferroelectric liquid crystal display as claimed in claim 1, wherein the liquid crystal panel comprises a sensor for measuring the temperature of the liquid crystal panel, a heater for heating the liquid crystal panel and a heater control circuit for controlling the temperature of the liquid crystal panel, and means for transmitting the detected temperature of the panel to the heater control circuit to be maintained thereby.

3. An antiferroelectric liquid crystal display as claimed in claim 2, wherein the sensor for measuring the temperature of the liquid crystal panel is a temperature sensor.

4. An antiferroelectric liquid crystal display as claimed in claim 2, wherein the sensor for measuring the temperature of the liquid crystal panel includes means for measuring the spontaneous polarization reversal current in the liquid crystal material.

5. An antiferroelectric liquid crystal display having a liquid crystal panel including an antiferroelectric liquid crystal material sandwiched therein and in which a smectic layer is formed, and wherein once the temperature of the liquid crystal panel, after power on, reaches a temperature at which the smectic layer spacing in the antiferroelectric liquid crystal material becomes the smallest, a layer structure control voltage, which is able to realign the layer, is applied at least once to the liquid crystal panel.

6. An antiferroelectric liquid crystal display as claimed in claim 5, wherein the display is constructed so that after the layer structure control voltage is applied, the temperature of the liquid crystal panel is maintained at the temperature at which the smectic layer spacing in the antiferroelectric liquid crystal material is the smallest.

7. An antiferroelectric liquid crystal display as claimed in claim 6, wherein the liquid crystal panel comprises a sensor for measuring the temperature of the liquid crystal panel, a heater for heating the liquid crystal panel and a heater control circuit for controlling the temperature of the liquid crystal panel, and means for transmitting the detected temperature of the panel to the heater control circuit to be maintained thereby.

8. An antiferroelectric liquid crystal display as claimed in claim 7, wherein the sensor for measuring the temperature of the liquid crystal panel is a temperature sensor.

9. An antiferroelectric liquid crystal display as claimed in claim 7, wherein the sensor for measuring the temperature of the liquid crystal panel includes means for measuring the spontaneous polarization reversal current in the liquid crystal material.

10. An antiferroelectric liquid crystal display as claimed in claim 5, wherein the layer structure control voltage is a rectangular waveform having positive and negative polarities.

11. An antiferroelectric liquid crystal display as claimed in claim 5, wherein the liquid crystal panel includes a backlight, and means for blocking light from the backlight when the layer structure control voltage is applied to the liquid crystal panel.

12. An antiferroelectric liquid crystal display having a liquid crystal panel including an antiferroelectric liquid crystal material sandwiched therein and in which a smectic layer is formed,
    wherein the display is constructed so that when the temperature of the liquid crystal panel changes during production of a display and thereafter reaches a temperature at which the smectic layer spacing in an antiferroelectric liquid crystal material becomes the smallest, a layer structure control voltage, which is able to realign the layer, is applied at least once to the liquid crystal panel.

13. An antiferroelectric liquid crystal display as claimed in claim 12, further comprising, after the layer structure control voltage waveform is applied, means for maintaining the temperature of the liquid crystal panel at the temperature at which the smectic layer spacing in the antiferroelectric liquid crystal material is the smallest.

14. An antiferroelectric liquid crystal display as claimed in claim 13, wherein the means for maintaining the temperature includes a sensor for measuring the temperature of the liquid crystal panel, a heater for heating the liquid crystal panel and a heater control circuit for controlling the temperature of the liquid crystal panel, and
    means for transmitting the detected temperature of the panel to the heater control circuit to be maintained thereby.

15. An antiferroelectric liquid crystal display as claimed in claim 14, wherein the sensor for measuring the temperature of the liquid crystal panel is a temperature sensor.

16. An antiferroelectric liquid crystal display as claimed in claim 14, wherein the sensor for measuring the temperature of the liquid crystal panel includes means for measuring the spontaneous polarization reversal current in the liquid crystal material.

17. An antiferroelectric liquid crystal display as claimed in claim 12, wherein the layer structure control voltage is a rectangular waveform having positive and enegative polarities.

18. An antiferroelectric liquid crystal display as claimed in claim 12, wherein the liquid crystal panel includes a backlight, and means for blocking light from the backlight when the layer structure control voltage is applied to the liquid crystal panel.

19. An antiferroelectric liquid crystal display having a liquid crystal panel including an antiferroelectric liquid crystal material sandwiched therein and in which a smectic layer is formed, comprising;
    a sensor for measuring the temperature of the liquid crystal panel,
    a drive voltage waveform circuit for displaying the display data,
    a circuit for generating a layer structure control voltage, which is able to realign the layer,
    a voltage waveform control circuit for selecting for use either the drive voltage waveform circuit or the circuit for generating a layer structure control voltage waveform based on the temperature measured by the sensor,
        wherein the voltage waveform control circuit selects the circuit for generating a layer structure control voltage waveform when the temperature of the liquid crystal panel has reached a temperature at which the smectic layer spacing in the antiferroelectric liquid crystal material becomes the smallest.

20. An antiferroelectric liquid crystal display as claimed in claim 19, further comprising, after the circuit for generating a layer structure control voltage waveform is selected, means for maintaining the temperature of the liquid crystal panel at the temperature at which the smectic layer spacing in the antiferroelectric liquid crystal material is the smallest.

21. An antiferroelectric liquid crystal display as claimed in claim 19, wherein the layer structure control voltage is a rectangular waveform having positive and negative polarities.

22. An antiferroelectric liquid crystal display as claimed in claim 19, wherein the liquid crystal panel includes a backlight, and means for blocking light from the backlight when the layer structure control voltage is applied to the liquid crystal panel.

23. An antiferroelectric liquid crystal display as claimed in claim 19, wherein the sensor for measuring the temperature of the liquid crystal panel is a temperature sensor.

24. An antiferroelectric liquid crystal display as claimed in claim 19, wherein the sensor for measuring the temperature of the liquid crystal panel includes means for measuring the spontaneous polarization reversal current in the liquid crystal material.

25. A system for controlling an antiferroelectric liquid crystal panel to alleviate the phenomenon of image-sticking without degradation of the quality of the display, comprising:
    a pair of substrates,
    a liquid crystal layer provided between the pair of substrates and having a smectic layer,
    a first circuit for applying drive voltages to the liquid crystal panel to produce a display,
    means for heating the liquid crystal panel to maintain the liquid crystal panel at a predetermined temperature where the layer spacing of the smectic layer is at
    approximately its smallest value, and
    a second circuit for applying a layer structure control voltage to the liquid crystal panel at the predetermined temperature.

26. A system as claimed in claim 25, further comprising:
a voltage control circuit for controlling the timing and the temperature for the application of the layer structure control voltage.

27. A system as claimed in claim 26, further comprising:
means for blocking backlight in the panel when the layer structure control voltage is applied to the liquid crystal panel.

* * * * *

UNITED STATES PATENT AND TRADEMARK OFFICE
CERTIFICATE OF CORRECTION

PATENT NO.    : 6,369,872 B1
DATED         : April 9, 2002
INVENTOR(S)   : Shinya Kondoh It is certified that error appears in the above-identified patent and that said Letters Patent is hereby corrected as shown below:

Column 9,
Line 53, "enegative" should read -- negative --.

Signed and Sealed this

Eleventh Day of March, 2003

JAMES E. ROGAN
*Director of the United States Patent and Trademark Office*